United States Patent [19]

French et al.

[11] Patent Number: 4,722,604

[45] Date of Patent: Feb. 2, 1988

[54] RADIATION INTERFERENCE DEVICES

[75] Inventors: Herbert A. French, Emsworth; Philip Sutton, Portsmouth, both of England

[73] Assignee: The Secretary of State for Defence in Her Britannic Majesty's Government of the United Kingdom of Great Britain and Northern Ireland, London, England

[21] Appl. No.: 461,203

[22] Filed: Jan. 20, 1983

[30] Foreign Application Priority Data

Jan. 21, 1982 [GB] United Kingdom ............... 8201594

[51] Int. Cl.[4] .................. G01B 9/02; G01J 3/45; H04B 9/00
[52] U.S. Cl. .................. 356/345; 356/346; 356/152; 455/611; 455/615
[58] Field of Search ............ 356/5, 346, 345, 152; 455/611, 615

[56] References Cited

U.S. PATENT DOCUMENTS

| | | | |
|---|---|---|---|
| 3,622,790 | 11/1971 | Zavodny | 455/611 |
| 3,699,445 | 10/1972 | Kinsel | 455/611 |
| 4,085,319 | 4/1978 | Deitz | 455/611 |
| 4,095,900 | 6/1978 | Murphy et al. | 356/346 |
| 4,147,424 | 4/1979 | Foster et al. | 356/346 |
| 4,167,329 | 9/1979 | Jelalian | 356/5 |
| 4,170,416 | 10/1979 | Fencil | 356/346 |
| 4,222,667 | 9/1980 | Layne | 356/346 |

OTHER PUBLICATIONS

G. A. Vanasse et al., Optical Engineering, Jul.-Aug. 1979, vol. 18, No. 4, p. 403.

Primary Examiner—Stephen C. Buczinski
Attorney, Agent, or Firm—Cushman, Darby & Cushman

[57] ABSTRACT

An interference device for discriminating between radiation sources of differing coherence length comprises means to divide received radiation from a source into two components. A path difference, defining a coherence length cut-off, is introduced into the path of one component and the components are brought together for interference. The recombined light passes through a reticle with alternate opaque and tranparent bars and an optical band-pass filter to a detector. Interference fringes present in the plane of the reticle are swept across the reticle by the action of the collection optical system of the device which includes a scanning rotating mirror. Two similar devices can be arranged for band-pass coherence length filtering and when used in conjunction with a light soruce whose coherence is modulated the device can be used for signalling.

19 Claims, 12 Drawing Figures

RADIATION INTERFERENCE DEVICES

This invention relates to radiation interference devices.

Optical interference devices such as the Michelson interferometer are well known in the prior art. Such devices typically operate by amplitude division of an optical wavefront and subsequent recombination to form interference fringes. The fringes are formed between two wave-front divisions of equal or nearly equal optical path length. If the optical path difference is larger than the coherence length of light from the source employed, no interference fringes are seen. Accordingly, interferometers and related devices are operated at path differences less than the coherence length of the light source of interest.

It is an object of the present invention to provide a modified interference device adapted to distinguish coherent radiation from incoherent radiation.

The present invention provides an interference device including means for dividing radiation into two components, means for recombining the components with a path difference introduced there between, means for selectively modulating radiation from interference fringes produced by the recombination, and radiation detecting means arranged for selective response to modulated radiation. The invention has the advantage that radiation having a coherence length greater than the path difference employed may be detected in the presence of radiation having a coherence length shorter than the path difference; shorter coherence-length light cannot produce interference fringes in the device and may neither be modulated nor detected by the selective means therefor.

In one preferred embodiment, the invention may be arranged to identify coherent radiation sources in a scene in the presence of incoherent radiation. In this embodiment the invention may include means for scanning a field or view emitting radiation to be divided into the said two components. The invention may also include means for recording the output of the detecting means as a function of scan position in order to provide an indication of coherent source location. In this embodiment interference fringes from a coherent source may conveniently be modulated by a stationary reticle of appropriate spatial frequency located before the detector. The operation of scanning the field of view effects movement of the fringe pattern across the reticle producing radiation modulated at a frequency determined by the scanning rate and the reticle spatial frequency. The detecting means preferably includes a detector to provide an electrical signal in response to incident radiation and filter means tuned to the modulation frequency imposed on coherent radiation by the scanning operation. The radiation is preferably visible or infra-red light. Conveniently, the invention may include a periscope incorporating a scanning mirror for collecting light from and scanning the field of view, a Fresnal biprism for dividing and recombining light from the field of view, a transparent plate to introduce a path difference and an optical band-pass filter to reduce unwanted light reaching the detector. The transparent plate may be attached to the biprism. The transparent plate acts as a phase or temporal delay in one of the beam components.

The modulation means in the present invention sensitises the detecting means of the device to the presence of interference fringes.

In one arrangement of the invention a beam splitter, as in a Michelson interferometer, may be used to divide incident radiation into two beams which after reflection are recombined thereby, the modulation means and the radiation detecting means being arranged to determine the spatial variation of the interference fringes. The limit of the spatial extent of the interference pattern is determined when the coherence length of the incident radiation is equal to the path difference between the two beams incident at the limit. Thus in this arrangement the spatial geometry of the fringes gives wavelength information, the fringe "visability" gives a measure of coherence length, and the position of the interference pattern in the image plane will give the location of a coherent source within the field of view of the device.

The above arrangements may include a phase modulator in the path of one of the two beams. The phase modulator may be an electrically driven Pockels cell or a mechanically oscillated glass delay plate. The result is that not only is there the characteristic interference pattern, but the pattern becomes time varying at a frequency and phase determined by the target's wavelength. Also the amplitude of the temporal modulation is related to the visibility of the fringes and hence the coherence of the target source can be measured.

In a further embodiment, the invention may be arranged for the detection of light having a coherence length in a given range. In this embodiment, the invention may incorporate two interference devices in accordance with the last two preceding paragraphs, the devices having unequal path differences, and included means for comparing the response of the two detecting means to indicate radiation detected by one device but not the other. This provides selective detection of radiation having a coherence length between the lower limit set by the shorter path difference of one device of the invention and the upper limit of the longer path difference set by the other device. Whereas one device of the invention acts as a high pass-filter, two devices operated in this manner act as a band-pass coherence length filter.

The invention may also include means for varying the introduced path difference, or as the case may be means for synchronously varying both path differences, whereby a coherence length spectrum of a radiation source may be obtained.

The invention may alternatively include a first means for dividing radiation into two components, a first means for recombining the components with a path difference introduced therebetween, a first means for selectively modulating radiation from interference fringes produced by the recombination, means for partially delaying and recombining radiation from the interference fringes to form a further set thereof, a second meand for modulating the further set of interference fringes and means for selectively detecting and distinguishing the modulations introduced by the first and second means therefor. In this embodiment the invention acts as a coherence length filter in which the ratio of the contrasts of the two sets of fringes is inversely proportional to the square of coherence length. The first and second modulating means may each consist of a reticle having alternate opaque and transparent bars arranged parallel to and vibratable across the respective interference fringes by drive means. A fresnel biprism and first delay plate may be employed for dividing and recombining radiation, and a second delay plate may be employed for partially delaying the radiation to form further interference fringes. The first and second modulating means are arranged to introduce different modulation frequencies, and the detecting means is arranged to distinguish envelope and carrier wave modulation by electronic filtering.

In an alternative embodiment, the invention additionally includes a transmitter of radiation having a modulated coherence length, and an interference device of the invention for discrimination between radiations of differing coherence length. The transmitter may include means for transmitting alternatively coherent and incoherent radiation. In this embodiment the invention provide a means for information transfer by coherence length modulation of radiation since the detecting means preferentially detects the modulation imposed on the radiation coherence length.

In order that the invention may be more fully understood, embodiments thereof will not be described, by way of example only, with reference to the accompanying drawings, in which FIG. 1 is a schematic plan view of a coherent radiation detector in accordance with the invention, FIG. 1a is a schematic view of a bandpass filter constructed from two devices as shown in FIG. 1.

Figure 1:
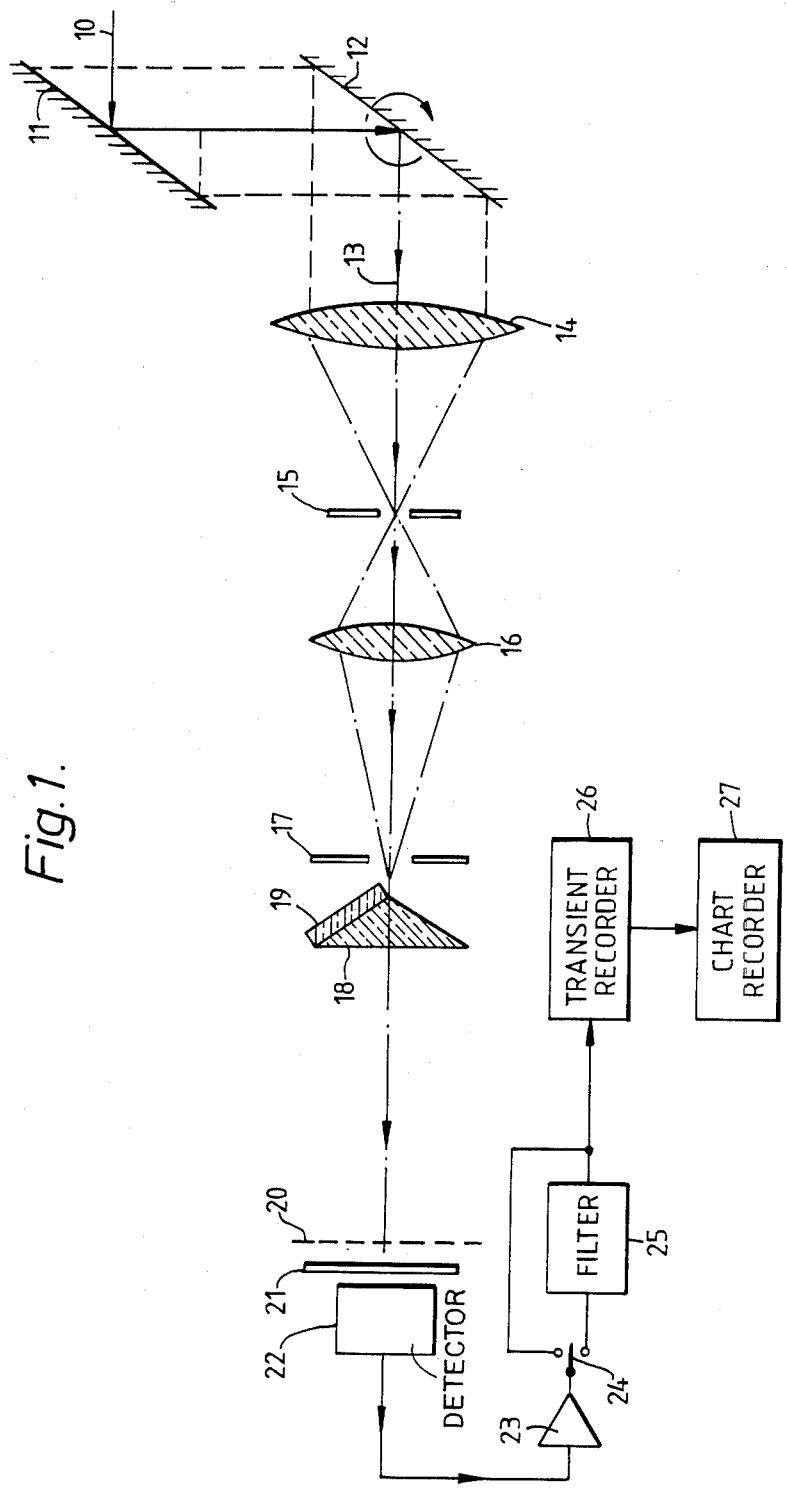

Referring to FIG. 1, light 10 from a field of view (not shown) is reflected from a fixed 45° mirror 11 to a rotating mirror 12. The light passes at 13 to a first lens 14 focussed at the centre of a first field stop 15. Light diverging from the first field stop 15 is focussed by a second lens 16 through a second field stop 17 onto a Fresnel biprism 18. A glass delay 19 is attached to the upper oblique face of the biprism 18. Light from the biprism passes via a reticle 20 and a band-pass filter 21 to a detector 22. The reticle consists of alternate transparent and opaque bars extending normally to the drawing. The electrical output of the detector 22 is fed to a buffer amplifier 23, and thence via a switch 24 and filter 25 to a transient recorder 26 or directly to the transient recorder 26.

The arrangement of FIG. 1 operates as follows. With the rotating mirror 12 in the 45° position shown, the mirrors 11 and 12 act as a horizontal periscope directing light from the field of view via the lenses 14 and 16 to the biprism 18. The biprism 18 produces two overlapping images of the scene. The optical energy from the scene is divided by the biprism 18 and travels along two paths (not shown), one to the left and one to the right of the prism apex. Refraction at the biprism 18 produces two beams which cross in or near the plane of the reticle 20. The effect of the glass delay plate is to introduce a relative propagation delay into one of the paths of light defined by the biprism 18. Accordingly, interference fringes will be formed by the crossing beams produced by the biprism 18 if and only if the field of view contains a source of light having a coherence length greater than the path difference introduced by the glass plate 19. Sources of shorter coherence length will produce incoherent crossing beams at the reticle 20, and as is well known incoherent light cannot produce interference fringes.

The periodicity or spatial frequency of the bars of the reticle 20 is chosen to match the spacing of interference fringes from a source of coherent light of interest. This sensitises the apparatus preferentially to one wavelength since other wavelengths will have different fringe spacings. When such a source of light is present in the field of view, and the mirror 12 is rotating, the interference fringe pattern of the coherent source is scanned (together with incoherent light from the field of view) across the reticle 20. Light from the interference fringes is modulated by the reticle by virtue of the scanning operation, but incoherent light remains substantially unmodulated. The filter 25 has a pass-band centred on the source wavelength of interest to avoid saturation of the detector 22 by incoherent light. The scanning operation accordingly produces a modulated pulse output signal from the detector when a coherent source is present in the field of view, together with incoherent light within the pass-band of the filter 20. The two-position switch 24 is included to allow the detector output signal to be displayed either unfiltered or after filtering by the filter 25. The filter 25 has a pass-band centered on the modulation frequency of the interference fringes of interest, the frequency being the product of the scan rate of the field of view across the reticle 20 and the spatial frequency of the reticle.

Figure 2:
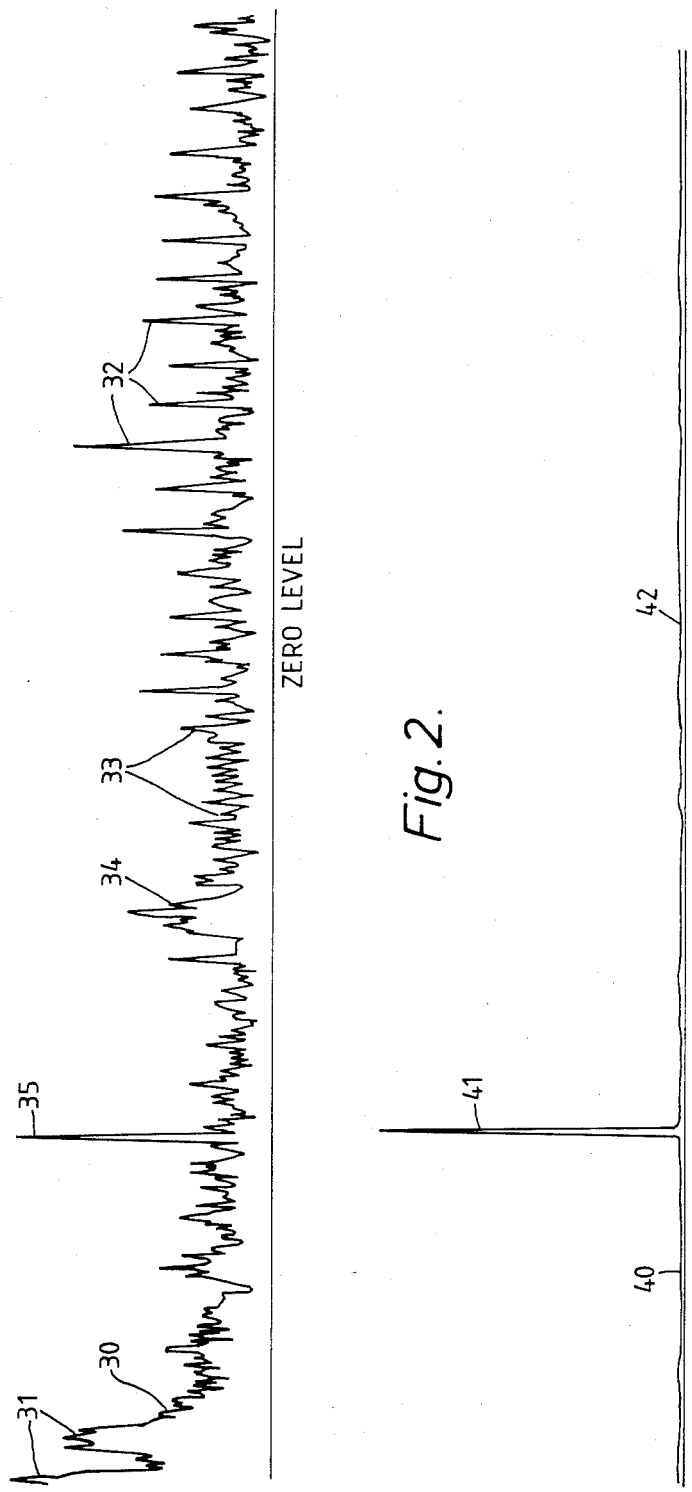
FIG. 2 illustrates detection of coherent detection.

Referring now also to FIG. 2, there is shown upper and lower scans 30' and 40 of a field of view recorded by the chart recorder 27. The upper and lower scans were obtained respectively without and with the use of the filter 25 to filter the output of the buffer amplifier 23. The field of view was a typical land scene of a bright skyline above fields and trees, the fields containing buildings and fencing. The scene had a radiant emission in the order of $25 \times 10^{-6}$ watt. $sr^{-1}.cm^{-2}.nm^{-1}$, and is considered typical of a heavily cluttered land background. A helium neon laser of $1 \times 10^{-3}$ watt output was placed in the background at 0.5 km from the detector, and its output was reduced at source by neutral filters to give $1 \times 10^{-8}$ watt. Over the 0.5 km separation, the laser power at the detector was calculated as approximately $1 \times 10^{-10}$ watt neglecting transmission losses.

The upper scan trace 30' in FIG. 2 shows detail due to the open field 431, regularly spaced fence posts 432, trees 433, and a hut 434, in addition to the laser output 435. The lower scan trace 440 however shows only a single peak 441 corresponding to the long coherence length radiation from the laser. All other signals have been filtered out by the filter 25, since being of such shorter coherence length they are unmodulated. It can be seen that the trace 440 lacks any distinguishable feature other than the laser peak 441 and very minor circuit noise 442.

From FIG. 2, it is seen that the circuit of FIG. 1 acts as a high-pass coherence length filter, since short coherence length signals are rejected by the filter 25.

By employing two devices 200 and 202 of the kind illustrated in FIG. 1, a band-pass coherence length filter may be constructed as shown schematically in FIG. 1a. The devices are arranged with respective glass delay plates 18 of differing thickness. Each then rejects radiation having a coherence length less than the limit set by the respective delay plate. The respective detector outputs after modulation filtering are then compared in a comparator 204 to extract signals detected in one device but not the other, ie signals above one high-pass limit and below the other.

Figure 3:
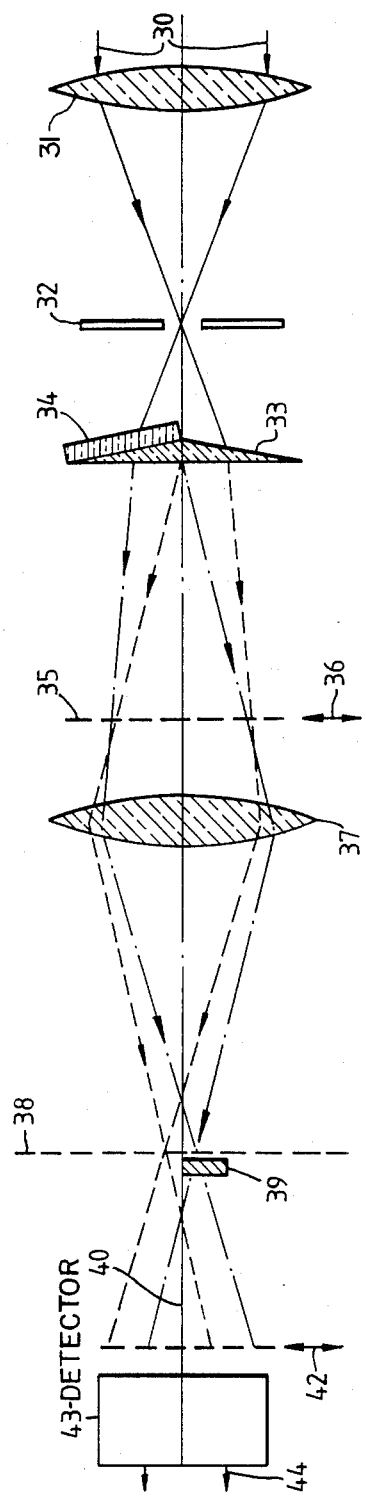
FIG. 3 is a schematic plan view of an optical coherence-lenght filter.
Figure 4:
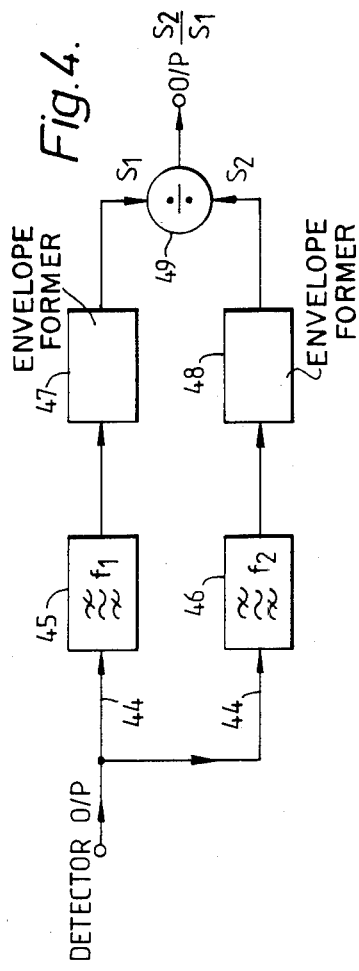
FIG. 4 is a block diagram of an electronic detection circuit for the filter shown in FIG. 3, FIGS. 5, 6 illustrate a two-channel coherence length detector.

Referring now to FIGS. 3 and 4, there is shown an alternative form of coherence length filter. Light 30 is focussed by a lens 31 to the centre of a stop 32 and diverges to a fresnel biprism 33 with attached delay-plate 34. The biprism 33 produces linear parallel interference fringes (not shown) at a first reticle 35. The reticle 35 consists of alternate transparent and opaque bars extending into the plane of the drawing parallel to the interference fringe pattern. Drive means (not shown) vibrates the reticle 35 across the fringes through an excursion in the plane of the drawing as indicated by arrow 36, the vibrational frequency being $f_1$. Light from the reticle 35 is focussed by a lens 37 to a plane 38, and a delay plate 39 is arranged in the path of light focussed below the centre-line 40 of the light rays. The light then diverges to a second reticle 41 vibrated at a frequency $f_2$ as indicated by arrow 42 and thence to a detector 43. The detector output indicated by arrows 44 passes in FIG. 4 to two band-pass filters 45 and 46 each with a respective waveform envelope former 47 and 48. The outputs of the envelope formers 47 and 48 are passed to a ratioing circuit 49.

The arrangement of FIGS. 3 and 4 operates as follows. The biprism 33 forms two apparent images which are each imaged by the lens 37 at the plane 38. Image points in the lower half of the plane 38 are subjected to a further delay by the second delay plate 39, and the lower and upper images combine to form a second set of interference fringes for modulation by the vibrating second reticle 41. Because of the additional path difference imposed by the second delay plate 39, the fringe contrast at the second reticle 41 is reduced compared to that at the first reticle 35. The action of the vibrating second reticle 41 impose a second modulation on the already modulated light signal at a second frequency $f_2$. The modulation frequencies $f_1$ and $f_2$ are chosen to be suitably different to facilitate electronic signal processing. The detector output at 44 appears as a conventional amplitude modulated signal, the carrier wave identifying the modulation imposed by one reticle and the amplitude modulation that imposed by the other. The electronic filters 45 and 46 are tuned to the modulation frequencies $f_1$ and $f_2$ respectively, and the ratio at the output of the ratioing circuit 49 is a function of the coherence length of the light 30. It can be shown that the ratio of the fringe contrasts $A_1$ and $A_2$ produced at the first and second reticles 35 and 41 respectively is given, for light having a Gaussian intensity/wavelength distribution by:

$$\log e \frac{A_1}{A_2} = \frac{1}{2} \left[ \frac{\pi \Delta \lambda}{\lambda^2} \right]^2 [l_2^2 - l_1^2] \quad (1)$$

Where $l_1$ and $l_2$ are the optical path differences introduced respectively by the first and second delay plates 34 and 39, $\Delta\lambda$ is the optical line width and $\lambda$ the wavelength of the light 30. The expression $\Delta\lambda/\lambda^2$ is the reciprocal of the coherence length.

Whereas the arrangements of FIGS. 1 and 3 employ biprisms and fixed delay plates, other means for dividing and recombining the light or introducing a relative delay or path difference may be employed, such as for example a Michelson interferometer arrangement. With a delay plate in one interferometer beam, the high pass coherence filter cut-off may be scanned by varying the inclination of the plate to the beam. With two such interferometers with differing relative delays, the angles of the delay plates to the respective beams may be scanned in synchronism to produce a scanning band-pass filter or coherence length spectrometer, the detection electronics being arranged to indicate signals arising in one interferometer but not in the other.

If a Michelson interferometer is employed as described, fringe modulating means appropriate to the interferometer fringe pattern must be employed. The principles of matching reticles to fringe patterns are well-known in the art. Since an inferometer is capable of broad-band or multi-wavelength operation, broad-band modulating means may be employed.

Figure 5:
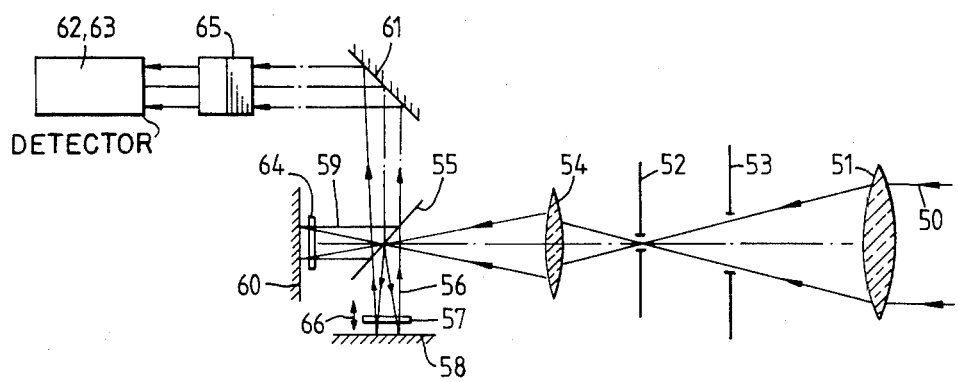
Figure 6:
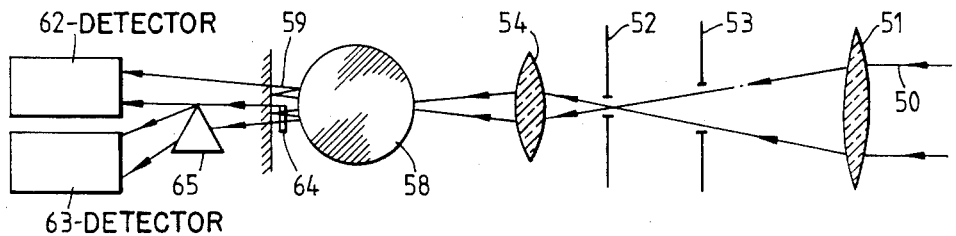

An example of a band-pass interferometer based upon the beam splitting and beam recombination principles of the Michelson interferometer is described with reference to FIGS. 5–9. FIGS. 5 and 6 show a two-channel coherence sensor adapted for band-pass coherence measurement. Radiation 50 is focussed by lens 51, a field stop 52 being located at the point of focus and an aperture stop 53 limiting the beam width. The radiation is then focussed by a second lens 54 on to a partly silvered beam splitter 55. A first beam 56 is reflected from the beam splitter through a phase modulator 57 to a mirror 58 where it is reflected back through the phase modulator 57 and is transmitted through the beam splitter 55. A second beam 59 is transmitted through the beam splitter to a minor 60 where it is reflected back to the beam splitter and reflects from the beam splitter to recombine with the first beam to form a beam incident on the 90° beam deflecting mirror 61. The beam is then incident on the detectors 62 and 63. Two channels are provided by placing a glass delay plate 64 in the lower half of the second beam 59 transmitted by the beam splitter and reflected from the mirror 60. A glass prism 65 is then located between the beam deflecting mirror 61 and the detectors such that the recombined first beam and second beam (unaffected by the glass delay 64) pass directly to the detector 62 while the recombined first beam and the second beam (modulated by the glass delay) are refracted towards the detector 63. Thus the arrangement effectively comprises two sensors with the upper and lower parts of the beam being led to the separate detectors.

Consider the upper beam falling on the detector 62. A path difference is introduced in the recombined radiation by reducing the distance between the mirror 60 and the beam splitter 55 relative to the separation between the beam splitter 55 and the mirror 58. In the lower beam the path difference is achieved by introducing the glass delay plate 64 which has the effect of "moving" the mirror 60 away from the beam splitter 55 beyond the zero path difference position. Thus the path delays associated with the upper and lower beams are different.

Figure 7:
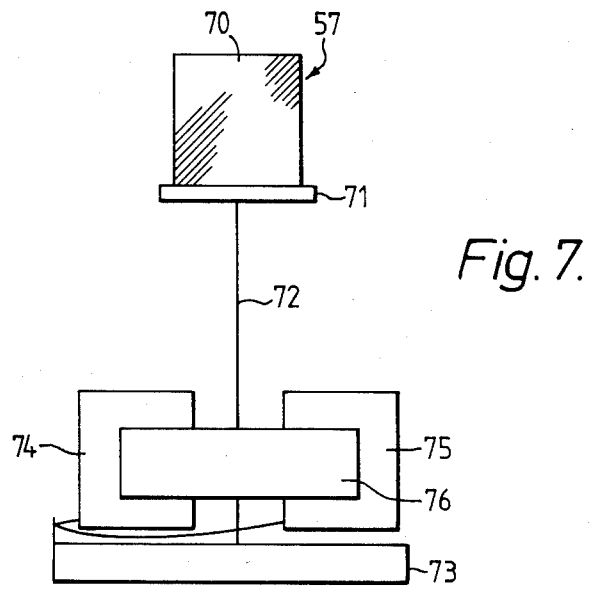
FIGS. 7, 8 show the phase modulator used in the detector of FIGS. 5, 6.
Figure 8:
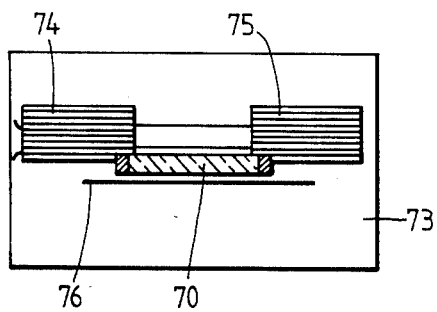

The phase modulator 57 is oscillated up and down as indicated by the arrows 66. FIGS. 7 and 8 show the phase modulator 57 in more detail: an electrically oscillated glass delay plate 70 modulating a beam transmitted there-through. The glass plate 70 is attached via a support 71 to a rod 72 rotatably mounted in a base plate 73. The base plate 73 also supports two electromagnets 74, 75. A magnetic plate 76 is attached to the rod 72 such that its ends are adjacent respective poles of the two electromagnets 74, 75. The electromagnets are wound by a common wire 50 to present opposite poles to the magnetic plate 76. Thus when the electromagnets are energised by an alternating drive current the magnetic plate oscillates causing the glass plate 70 to oscillate about the axis of the rod 72. The phase delay resulting from the passage of the radiation through the glass plate increases with the angle of tilt. When the phase modulator 57 is used in the detector shown in FIGS. 5 and 6, the arrangement is designed such that only the central fringe is produced at the plane of the detectors 62, 63: the action of the phase modulator is then such as to vary the intensity of the fringe in a periodic manner.

Figure 9:
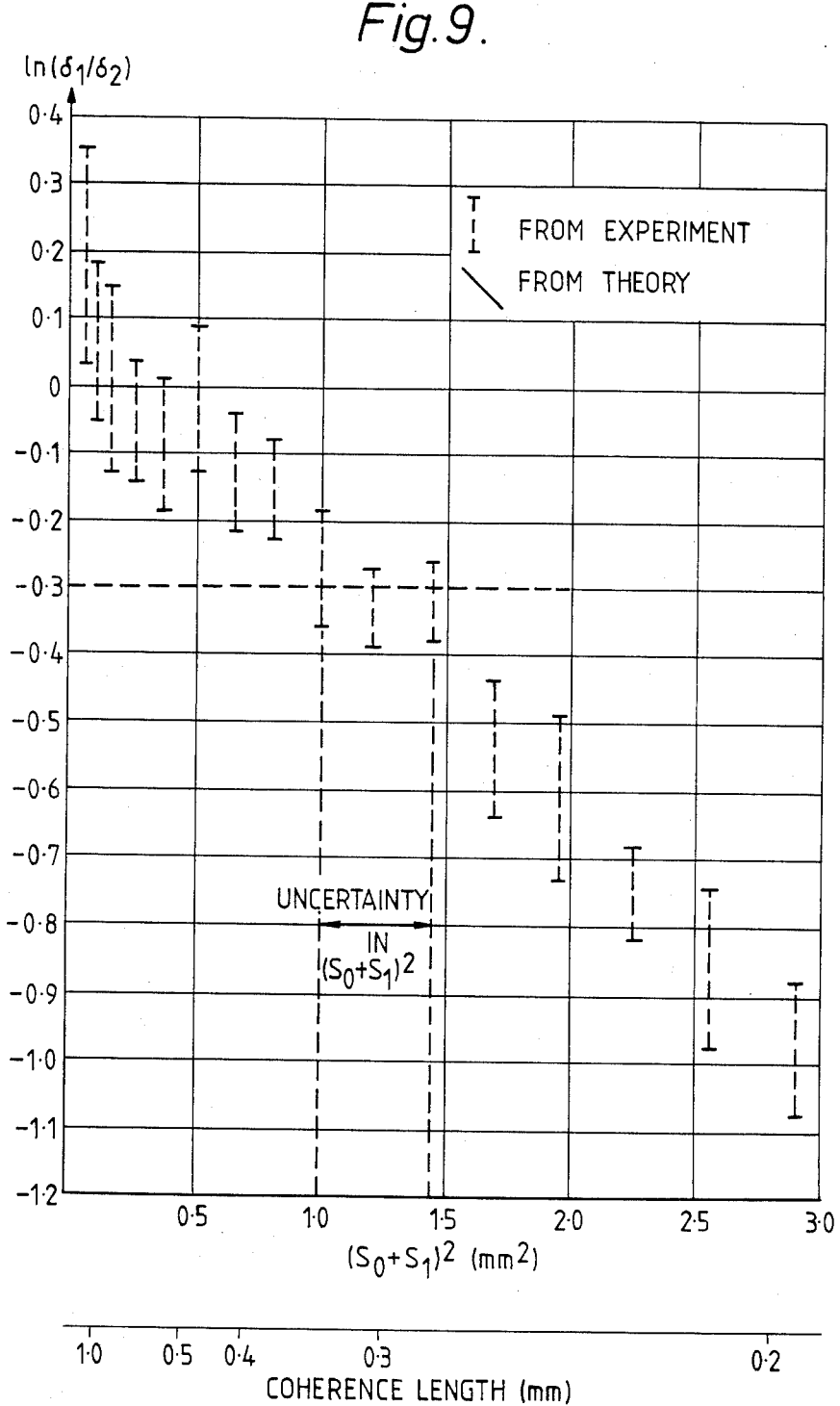
FIG. 9 is a graph showing the theoretical and measured performance of the arrangement of FIGS. 5-8.

In this band-pass arrangement the expression (1) shows that the coherence length is inversely proportional to the natural log of the ratio of the modulation amplitudes appearing at each channel. FIG. 9 is a graph demonstrating the comparison between theory and experimental results using this sensor for light at 6335A. The abscissa is labelled in terms of coherence length and also a parameter $(So+S)^2$, used to describe the adjustments on the variable coherence length source used in the experiment. The error bars are the result of atmospheric turbulence effects. The present arrangement represents the worst case since the experiment was performed using a modulation frequency of 400 Hz which is near to the peak of the natural atmospheric turbulence. Considerable improvement would be obtained by choosing a modulation frequency higher than the maximum frequency of natural atmospheric turbulence ie greater than 2 kHz.

Whereas the invention has been described as operating in a reception mode only, it is also capable of operating as a transmission-reception device for the purposes of communication by coherence modulation. In this embodiment, the invention additionally incorporates a transmitter comprising a source of light adapted for coherence length modulation. The light source may be a laser with a tunable output bandwidth, or alternatively an incandescent lamp from which a variable wavelength interval is selected by means of an adjustable interference filter. The high-pass cut-off frequency of the receiver, such as that illustrated in FIG. 1 for example, is adjusted (by appropriate choice of the glass plate thickness) to lie within the coherence length modulation range of the light source. Modulation of the light source coherence length then results in coherence length variation across the high-pass cut-off, with consequent pulsing of the detected signal. The modulation may be coded to carry information, in which case the detected signal would be decoded in the appropriate manner. In this way a coherence length modulation communication system may be formed.

Figure 10:
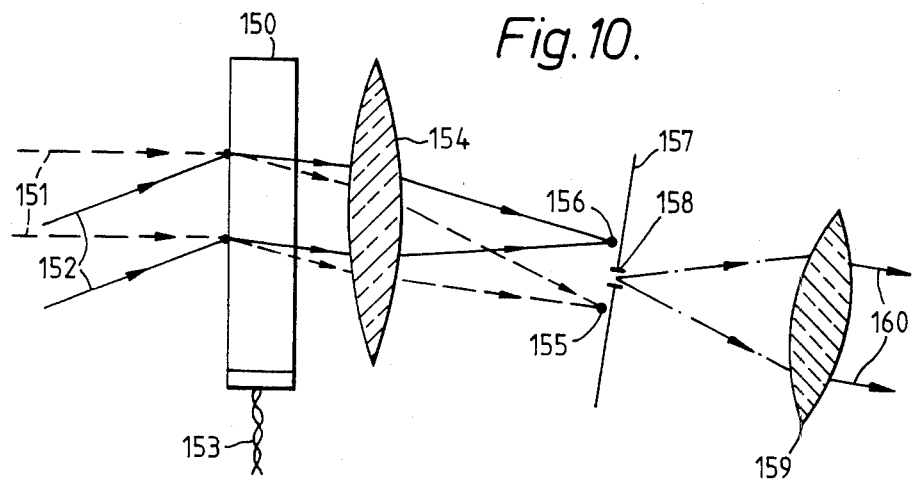
FIG. 10 is a schematic diagram of a coherence modulation transmitter.
Figure 11:
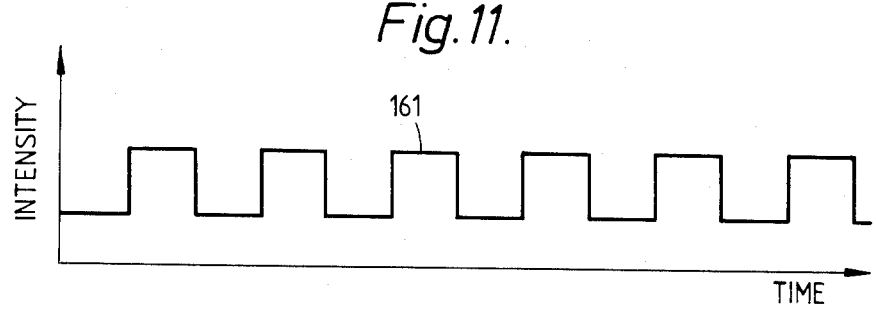
FIGS. 11, 12 illustrate amplitude and coherence modulation respectively produceable by the transmitter of FIG. 10.
Figure 12:
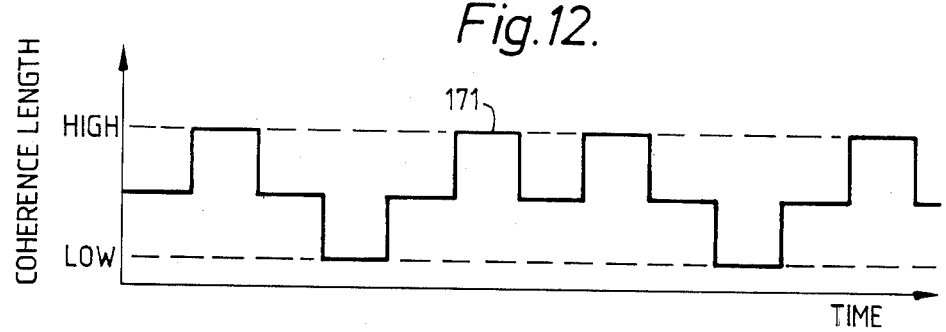

Referring now to FIGS. 10, 11 and 12, illustrating a specific form of transmitter of coherence-length modulation, an acousto-optic cell 150 is arranged in the crossing paths of collumated beams of laser light 151 and band-limited white light 152. The cell 150 is used in Bragg mode, and is driven via an output lead 153 by a frequency-modulated electrical signal from a generator (not shown). The beams 151 and 152 are deflected by the cell 150, and a lens 154 focusses the light to provide images 155 and 156 of laser light and white light respectively. The images 155 and 156 appear in the plane of an opaque screen 157 having a central slit 158. When the cell driving signal frequency is $f_o$, the images 155 and 156 are spaced symmetrically as shown either side of the slit 158. When the frequency changes to $f_o + \delta f$, the white light image 156 appears at the slit, and similarly the laser light image 155 appears at the slit at frequency of $f_o - \delta f$. Modulation of the electrical driving signal accordingly gives alternatively white light and laser light passing through the slit 158 to impinge on a collinating lens 159 producing a parallel transmission beam 160. The white light beam is characterised by a very much shorter coherence length than that of the laser beam.

FIGS. 11 and 12 show the intensity/time and coherence state/time profiles 161 and 171 respectively of the transmission beam 160. It can be seen that the beam 160 carries quite different intensity and coherence modulations, thus providing two different communication channels. A conventional optical receiver would detect the profile shown in FIG. 11, whereas a coherence sensitive receiver such as that illustrated in FIG. 1 would decode the coherence modulation shown in FIG. 12. Bit rates of tens of megabauds are possible using current acousto-optic devices. Although FIGS. 10 and 12 illustrate two-state coherence logic, multiple state logic may be implemented if several light sources of differing coherence length are combined. The acousto-optic cell 150 would be employed to scan each source in turn over the slit 158, and a multi-channel coherence detector would be used, each channel arranged to detect light of a respective coherence length.

A communications system can also be devised according to the invention by utilising analogue signalling rather than digital signalling. The coherence length is made a continuously variable quantity, for example, by modulation with a speech waveform. The source could be a laser controlled by a feedback arrangement or a laser diode having supply inputs controlled such that the coherence of the emitted radiation is made to vary.

The reticles described with reference to FIGS. 1 and 3 were of constant spatial frequency appropriate to single wavelength detection independently of source geometry. It will be apparent to those skilled in the art of Fourier transform optics that reticles of different geometry may be employed which have multiple wavelength capability or sensitivity to specific source geometry or spatial frequencies. In the prior art it is known to distinguish between light sources on the basis of spectral and/or spatial characteristics. The present invention make it possible to distinguish between light sources on the basis of coherence length properties also, thus providing a further domain for light source characterisation. It is envisaged that coherence length filtering in accordance with the invention may be combined with spectral and/or spatial filtering techniques.

It will be apparent to those skilled in the art that the invention is not restricted to any particular part of the electromagnetic spectrum, although it is particularly applicable in the visible and infra-red regions.

I claim:

1. A coherence length filter device for detection of coherent radiation from a source having a coherence length in a given range including: means for receiving radiation emitted by the source; means for dividing the received radiation into two component beams; means placed in the path of one of the component beams for introducing a phase delay; means for recombining the phase delayed beam and said other component beam; means for selectively modulating radiation from interference fringes produced by the recombination; and radiation detection means for selective response to the modulated radiation; the phase delay being selected to be less than the coherence length of the source radiation to be detected but greater than the coherence length of unwanted background radiation to distinguish said coherent radiation from incoherent radiation.

2. A coherence length filter device as claimed in claim 1 wherein said receiving means includes a periscope incorporating a scanning light for collecting light from and scanning the field of view, said dividing means includes a Fresnel biprism, said phase delay introducing means includes a transparent plate and said radiation detector means includes an optical band-pass filter.

3. A coherence length filter device as claimed in claim 1 wherein said modulating means includes a cyclically variable phase modulator in the path of one of the beams and said radiation detecting means includes means for measuring the temporal variation of the interference fringes produced thereby to determine the coherence length of the radiation.

4. A coherence length filter device as claimed in claim 1 wherein said dividing means includes a partially reflecting beam splitter.

5. An interference device according to claim 4 wherein said modulating means includes a stationary reticle of appropriate spatial frequency located before the detecting means to modulate the interference fringes produced by a coherent source in the field of view.

6. An interference device according to claim 5 wherein the detecting means includes a detector to provide an electrical signal in response to incident radiation and filter means tuned to the modulation frequency imposed on coherent radiation by the scanning operation.

7. An interference device according to claim 4 wherein the transparent plate is attached to the biprism.

8. A coherence length filter arranged for detecting coherent radiation having a coherence length within a given range including first and second interference devices, each of said device comprising means for receiving coherent radiation emitted by the source, means for dividing received radiation into two components, means for recombining the components with a path difference therebetween, means for selectively modulating radiation from interference fringes produced by the recombination, and radiation detection means arranged for selective response to modulated radiation, the arrangement being such that the path differences of the first and second interference devices are different and the detection means from the first and second interference devices are connected to a comparator means for comparing the responses from the said two detection means.

9. A coherence length filter according to claim 8 including means to synchronously vary the path differences whereby a coherence length spectrum of a radiation source may be obtained.

10. A coherence length filter device as claimed in claim 8 wherein said modulating means includes a cyclically variable phase modulator in the path of one of the beams and said radiation detecting means includes means for measuring the temporal variation of the interference fringes produced thereby to determine the coherence length of the radiation.

11. A coherence length filter device as claimed in claim 10 wherein said modulating means includes a stationary reticle mounted before said detector means.

12. A coherence length filter device as claimed in claim 11 wherein said detector means includes a detector to provide an electric signal in response to incident radiation and filter means tuned to the modulator frequency imposed on said coherent radiation by scanning.

13. An interference device according to claim 10 wherein the phase modulator is a mechanically oscillated glass delay plate.

14. A coherence length filter as in claim 8, wherein said comparing means includes means for comparing the response from the said two detection means to indicate radiation detected by one of said devices but not the other of said devices.

15. A coherence length filter as in claim 8, wherein said means for comparing the responses of said two detection means includes means for determining the ratio of the responses from said two detection means.

16. A coherence length filter arranged for detecting radiation having a coherence length within a given range comprising means for dividing received radiation into two components, means for recombining the components with a path difference there-between, a first means for selectively modulating radiation from first interference fringes produced by the recombination, means for partially delaying and recombining radiation from said first interference fringes to form a second set of interference fringes, a second means for selectively modulating the second set of interference fringes and radiation detection means for selectively detecting and distinguishing the modulations introduced by the said first and second modulation means.

17. A coherence length filter according to claim 16 wherein the first and second modulating means each consist of a reticle having alternate opaque and transparent bars arranged parallel to and vibratable across the respective interference fringes by drive means.

18. A coherence length filter according to claim 17 wherein the first and second modulating means are arranged to introduce different modulation frequencies, and the detecting means is arranged to distinguish envelope and carrier wave modulation by electronic filtering.

19. A communications transmitter/receiver including: a receiver for discriminating between radiations of differing coherence length comprising means for dividing received radiation into two components, means for recombining the components with a path difference introduced there-between, means for selectively modulating radiation from interference fringes produced by the recombination, and radiation detection means arranged for selective response to modulated radiation; and a radiation transmitter including a radiation source and means to modulate the coherence length of the transmitted radiation.

* * * * *